United States Patent
Takakura (10) Patent No.: US 7,835,607 B2
(45) Date of Patent: Nov. 16, 2010

(54) OPTICAL-ELECTRICAL COMPOSITE TRANSMISSION DEVICE AND ELECTRONIC EQUIPMENT

(75) Inventor: Hideya Takakura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/349,635

(22) Filed: Jan. 7, 2009

(65) Prior Publication Data

US 2009/0196545 A1    Aug. 6, 2009

(30) Foreign Application Priority Data

Jan. 31, 2008    (JP) .................. P 2008-020322

(51) Int. Cl.
*G02B 6/44* (2006.01)
(52) U.S. Cl. ...................................... 385/101
(58) Field of Classification Search ............... 385/101
See application file for complete search history.

(56) References Cited

U.S. PATENT DOCUMENTS

| | | | |
|---|---|---|---|
| 6,344,977 B1 | 2/2002 | Takagi | |
| 7,211,784 B2 | 5/2007 | Sawada | |
| 7,333,682 B2 | 2/2008 | Kobayashi et al. | |
| 2005/0053340 A1 * | 3/2005 | Toriumi et al. | 385/101 |
| 2007/0206907 A1 | 9/2007 | Mizoguchi et al. | |
| 2008/0273844 A1 * | 11/2008 | Kewitsch | 385/101 |

FOREIGN PATENT DOCUMENTS

| | | |
|---|---|---|
| CN | 1670494 A | 9/2005 |
| CN | 1761107 A | 4/2006 |
| JP | 06-281831 | 10/1994 |
| JP | 2001-119460 | 4/2001 |
| JP | 2002-237226 | 8/2002 |
| JP | 2004-235455 A | 8/2004 |
| JP | 2007-140369 A | 6/2007 |
| JP | 2007-267358 | 10/2007 |

\* cited by examiner

*Primary Examiner*—Sung H Pak
(74) *Attorney, Agent, or Firm*—Nixon & Vanderhye P.C.

(57) ABSTRACT

An optical-electrical composite cable as an example of an optical-electrical composite transmission device has a flexible board as an electrical signal transmission member having an electric wiring section, and an optical fiber as an optical signal transmission member. The optical fiber is passed through a plurality of holes formed in a resin base section of the flexible board so as to thread through the resin base section. The flexible board and the optical fiber are integrated so as not to be separated from each other, so that even when the characteristics (tensile strength, thermal expansion coefficient) of the transmission lines respectively embodied by the flexible board and the optical fiber are different, the optical-electrical composite cable has stable flexibility as a whole.

7 Claims, 6 Drawing Sheets

OPTICAL-ELECTRICAL COMPOSITE TRANSMISSION DEVICE AND ELECTRONIC EQUIPMENT

This nonprovisional application claims priority under 35 U.S.C.§119(a) on Patent Application No(s). 2008-020322 filed in Japan on Jan. 31, 2008, the entire contents of which are hereby incorporated by reference.

BACKGROUND

1. Field of the Technology

The technology presented herein relates to an optical-electrical composite transmission device and electronic equipment having the same, and more specifically relates to an optical-electrical composite transmission device suitable for use in, for example, interconnections inside mobile equipment which require downsizing and space saving.

2. Description of the Related Art

In recent years, flexible cables for use in communication between the display section and the operating section of mobile phones are shielded for noise reduction (see JP 2001-119460 A).

However, it is predictable that processing of further high-definition dynamic images entails signal transmission at higher speed, and this higher speed communication causes a problem of electromagnetic wave noise. Moreover, in such application as mobile phone handsets having extremely limited space, shielding the flexible cables as a solution to the problem of electromagnetic waves causes the mobile phones to have complicated configuration and increased dimensions.

Accordingly, for such high speed signal transmission, optical communication has been proposed (see JP 2007-267358 A). However, even in the optical communication, it is necessary to transmit electrical signals to a power source line and a ground line to the display section.

Under these circumstances, an optical-electrical composite cable formed by cladding a power source cable and an optical fiber cable for transmitting optical signals together as one cable (see JP 2002-237226 A), and an optical-electrical composite signal cable using an optical waveguide (see JP H6-281831 A) have been proposed.

It is considered that these optical-electrical composite cables may have problems as stated below:

(i) Difference in material between an electrical signal transmission section and an optical signal transmission section may cause tensile stress and the like, and this stress concentrates on the weaker material;

(ii) Since the electrical signal transmission section is different in material from the optical signal transmission section, a difference in thermal expansion coefficient between the electrical signal transmission section and the optical signal transmission section may potentially deform signal lines at the time of high temperature or low temperature; and (iii) Manufacture costs of the optical-electrical composite cable are high.

In the case where the electrical signal transmission section is separated from the optical signal transmission section, their lines may be disjoined from each other due to their difference in flexibility and the like. As a result, space saving may become difficult.

Moreover, smaller and thinner mobile phones are being developed in recent years, and foldable mobile phones having a hinged section, for example, are required to make the signal line as small as about 3 mm or less in diameter due to structural limitations.

SUMMARY

The technology presented herein has been made to solve at least one of the aforementioned problems.

An optical-electrical composite transmission device according to an example embodiment includes an optical signal transmission member, and an electrical signal transmission member. And, the optical signal transmission member and the electrical signal transmission member being integrated so as not to be separated from each other.

In the example embodiment, the optical signal transmission member and the electrical signal transmission member are integrated so as not to be separated from each other. This makes it possible to avoid the problem of the lines disjoined due to difference in flexibility and the like, and to achieve space saving as a result. Consequently, the optical-electrical composite transmission device can be mounted on small-size equipment such as mobile phones, and can perform high speed signal transmission as well as transmission to the power source line and the ground line in the small-size equipment.

In one embodiment, the optical signal transmission member is optical fiber, and the electrical signal transmission member is a flexible board.

In the present embodiment, it becomes possible to achieve an optical-electrical composite cable which is flexible and which can achieve space-saving and low costs.

In one embodiment, the optical fiber is passed through a plurality of holes formed in the flexible board.

In the present embodiment, the flexible board and the optical fiber can be integrated so as not to be separated from each other with simplified configuration.

In one embodiment, a plurality of the holes are placed in a zigzag pattern along an extending direction of the flexible board.

In the present embodiment, the flexible board and the optical fiber can be integrated more firmly so as not to be separated from each other with simplified configuration.

In one embodiment, the flexible board has a plurality of mounting sections, and the optical fiber is passed through holes formed in the mounting sections, respectively. The number of the holes provided in each mounting section may be one or may be two or more.

The present embodiment is effective in the case where the width of an wiring section included in the flexible board is relatively large with respect to the flexible board and therefore it is difficult to form holes in regions other than the wiring section of the flexible board.

In one embodiment, the optical-electrical composite transmission device further includes an additional flexible board, and the optical fiber is interposed in between the additional flexible board and the flexible board as the electrical signal transmission member such that the optical fiber and the flexible boards are integrated together.

In the present embodiment, the flexible board and the optical fiber can be integrated more firmly so as not to be separated from each other with simplified configuration. Moreover, the additional flexible board can also be used as an electrical signal transmission member.

In one embodiment, the optical fiber is spirally wound around the flexible board.

In the present embodiment, adjusting the winding number of the optical fiber precludes necessity of the length precision of the optical fiber.

In one embodiment, the optical fiber is fitted in a plurality of notch sections formed in the flexible board.

In the present embodiment, the flexible board and the optical fiber can be integrated with more simplified configuration.

In one embodiment, the optical fiber is a plastic fiber.

In one embodiment, the optical fiber is a plastic-clad silica fiber.

In one embodiment, the optical fiber is a glass fiber.

In one embodiment, the optical fiber is a multi-core fiber.

In one embodiment, the optical signal transmission member is a waveguide board having an optical waveguide, and the electrical signal transmission member is an electric cable.

In the present embodiment, employing a waveguide board made of resin such as polyimide makes it possible to implement an optical-electrical composite cable which is flexible and which allows space-saving and low costs.

In one embodiment, the electric cable is passed through a plurality of holes formed in the waveguide board.

In the present embodiment, the waveguide board and the electric cable can be integrated so as not to be separated from each other with simplified configuration.

In one embodiment, a plurality of the holes are placed in a zigzag pattern along an extending direction of the waveguide board.

In the present embodiment, the waveguide board and the electric cable can be integrated more firmly so as not to be separated from each other with simplified configuration.

In one embodiment, the waveguide board has a plurality of mounting sections, and the electric cable is passed through holes formed in the mounting sections, respectively. The number of the holes provided in each mounting section may be one or may be two or more.

The present embodiment is effective in the case where the width of an optical waveguide section included in the waveguide board is relatively large with respect to the waveguide board and therefore it is difficult to form holes in regions other than the optical waveguide section of the waveguide board.

In one embodiment, the optical-electrical composite transmission device further includes an additional waveguide board, and the electric cable is interposed in between the additional waveguide board and the waveguide board as the optical signal transmission member such that electric cable and the waveguide boards are integrated together.

In the present embodiment, the waveguide board and the electric cable can be integrated more firmly so as not to be separated from each other with simplified configuration. Moreover, the additional waveguide board can also be used as an optical signal transmission member.

In one embodiment, the electric cable is spirally wound around the waveguide board.

In the present embodiment, adjusting the winding number of the electric cable precludes necessity of the length precision of the electric cable.

In one embodiment, the electric cable is fitted in a plurality of notch sections formed in the waveguide board.

In the present embodiment, the waveguide board and the electric cable can be integrated with more simplified configuration.

In one embodiment, the optical-electrical composite transmission device is an optical-electrical composite cable which is able to pass through a hole of 3 mm or less in diameter.

The optical-electrical composite transmission device of the present embodiment is suitable for, for example, foldable mobile phones having a hinged section.

The electronic equipment of one embodiment has the optical-electrical composite transmission device in which the optical signal transmission member and the electrical signal transmission member are integrated so as not to be separated from each other. Therefore, it becomes possible to perform high speed signal transmission as well as transmission to the power source line and the ground lines while achieving downsizing and space saving.

BRIEF DESCRIPTION OF THE DRAWINGS

The example embodiment will become more fully understood from the detailed description given hereinbelow and the accompanying drawings which are given by way of illustration only, and thus are not intended to limit the example embodiment presented herein, and wherein:

FIGS. 1A-1C are schematic views showing an optical-electrical composite cable as an optical-electrical composite transmission device in a first embodiment, in which

FIGS. 2A-2C are schematic views showing an optical-electrical composite cable as an optical-electrical composite transmission device in a second embodiment, in which

FIGS. 3A-3C are schematic views showing an optical-electrical composite cable as an optical-electrical composite transmission device in a third embodiment, in which

FIGS. 4A-4C are schematic views showing an optical-electrical composite cable as an optical-electrical composite transmission device in a fourth embodiment, in which

FIGS. 5A-5C are schematic views showing an optical-electrical composite cable as an optical-electrical composite transmission device in a fifth embodiment, in which

FIGS. 6A-6C are schematic views showing an optical-electrical composite cable as an optical-electrical composite transmission device in a sixth embodiment, in which

FIGS. 7A-7C are schematic views showing an optical-electrical composite cable as an optical-electrical composite transmission device in a seventh embodiment, in which

FIGS. 8A-8C are schematic views showing an optical-electrical composite cable as an optical-electrical composite transmission device in an eighth embodiment, in which

FIGS. 9A-9C are schematic views showing an optical-electrical composite cable as an optical-electrical composite transmission device in a ninth embodiment, in which

FIGS. 10A-10C are schematic views showing an optical-electrical composite cable as an optical-electrical composite transmission device in a tenth embodiment, in which

FIGS. 11A-11C are schematic views showing an optical-electrical composite cable as an optical-electrical composite transmission device in an eleventh embodiment, in which FIGS. 12A-12C are schematic views showing an optical-electrical composite cable as an optical-electrical composite transmission device in a twelfth embodiment, in which

DETAILED DESCRIPTION OF THE INVENTION

Hereinbelow, the present invention will be described in detail in conjunction with the embodiments with reference to the drawings.

First Embodiment

Figure 1A:
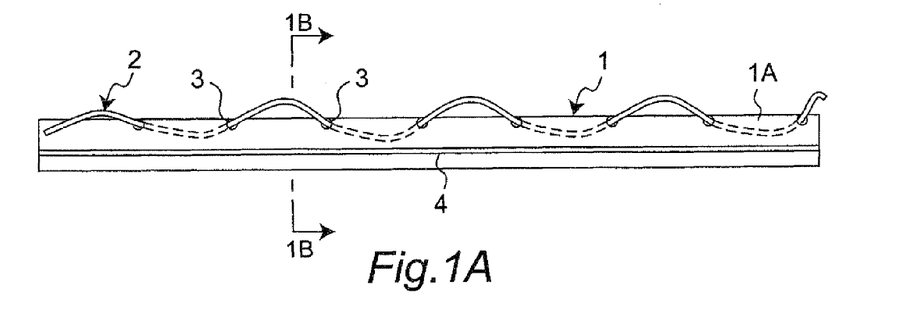
FIG. 1A is a plan view.
Figure 1B:
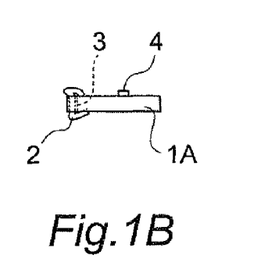
FIG. 1B is a cross sectional view taken along 1B-1B line of FIG. 1A.

FIG. 1A is a plan view for schematically showing an optical-electrical composite cable as an optical-electrical composite transmission device in the first embodiment, and FIG. 1B is a cross sectional view taken along 1B-1B line of FIG. 1A. In FIG. 1B, hatching is omitted to simplify the view (this also applies to other cross sectional views).

The optical-electrical composite cable of the first embodiment has a flexible board 1 as an electrical signal transmission member having an electric wiring section 4, and an optical fiber 2 as an optical signal transmission member. The optical fiber 2 is inserted in a plurality of holes 3 formed in a resin base section 1A of the flexible board 1 so as to thread through the resin base section 1A. The optical fiber 2 and the flexible board 1 constitute a composite cable. The electric wiring section 4 constitutes, for example, an electrical signal line and a power source line.

According to the optical-electrical composite cable in the first embodiment, the flexible board 1 which is an electrical signal transmission member and the optical fiber 2 which is an optical signal transmission member are integrated so as not to be separated. Consequently, even when the characteristics (tensile strength, thermal expansion coefficient) of the transmission lines respectively embodied by the flexible board 1 and the optical fiber 2 are different between them, an optical-electrical composite cable with stable flexibility as a whole can be implemented.

Figure 1C:
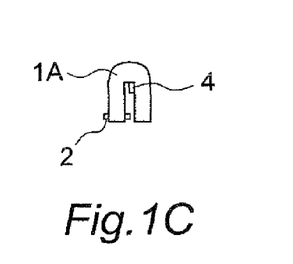
FIG. 1C is a view showing an end surface of the optical-electrical composite cable bent around the line parallel to the axial direction of the cable.

When passing the optical-electrical composite cable through a hole of 3 mm or less in diameter, the optical-electrical composite cable is bent around a line parallel to its axial direction as shown in FIG. 1C, so that the substantial diameter of the optical-electrical composite cable can be made 3 mm or less. Therefore, the optical-electrical composite cable of the present embodiment can be applied as, for example, the optical-electrical composite transmission device suitable for foldable mobile phones having a hinged section. This is also the same for optical-electrical composite transmission devices in other embodiments described later.

Second Embodiment

Figure 2A:
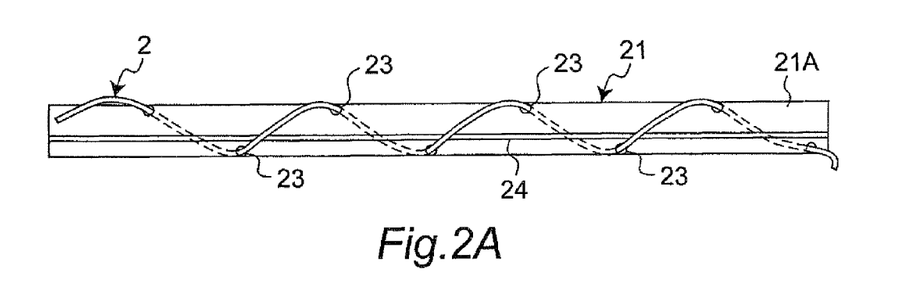
FIG. 2A is a plan view.
Figure 2B:
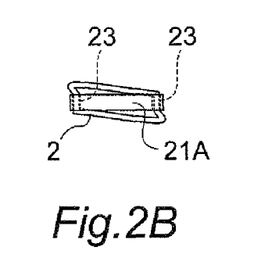
FIG. 2B is a cross sectional view taken along 2B-2B line of FIG. 2A.
Figure 2C:
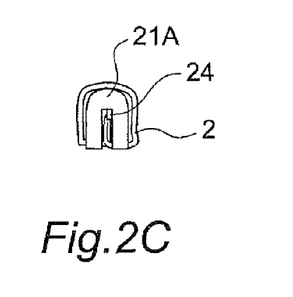
FIG. 2C is a view showing an end surface of the optical-electrical composite cable bent around the line parallel to the axial direction of the cable.

FIGS. 2A and 2B are a plan view and a cross sectional view for schematically showing an optical-electrical composite cable as an optical-electrical composite transmission device in the second embodiment. FIG. 2C shows the shape of the optical-electrical composite cable when passing through holes of 3 mm or less in diameter.

The optical-electrical composite cable of the second embodiment is structured so that holes 23 for passing the optical fiber 2 are formed in a zigzag pattern in a resin base section 21A of a flexible board 21 having an electric wiring section 24, and that the optical fiber 2 is inserted in a plurality of the holes 23 placed in a zigzag pattern so as to thread through the resin base section 21A. The electric wiring section 24 constitutes, for example, an electrical signal line and a power source line.

Although the length of the optical fiber 2 in the second embodiment is longer than that in the above-mentioned first embodiment, the optical fiber 2 is placed symmetrically with respect to the electric wiring section 24, so that the flexibility of the cable is superior to that in the first embodiment. Although in the present embodiments a plurality of the holes 23 formed in the resin base section 21A of the flexible board 21 are alternately placed in a zigzag pattern on both sides of the electric wiring section 24 one hole at a time, the holes 34 may alternately be placed on both sides of the electric wiring section 24 two or more holes at a time. Moreover, a plurality of the holes 23 do not necessarily have to be placed in a zigzag pattern, but may be formed in any part of the base section 21A as long as the electric wiring section 24 is not affected.

Third Embodiment

Figure 3A:
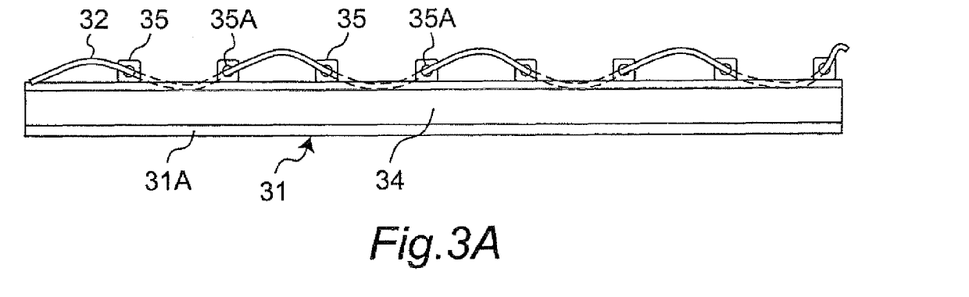
FIG. 3A is a plan view.
Figure 3B:
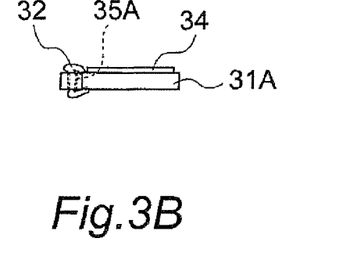
FIG. 3B is a cross sectional view taken along 3B-3B line of FIG. 3A.
Figure 3C:
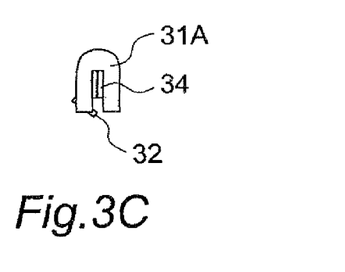
FIG. 3C is a view showing an end surface of the optical-electrical composite cable bent around the line parallel to the axial direction of the cable.

FIGS. 3A and 3B are a plan view and a cross sectional view for schematically showing an optical-electrical composite cable as an optical-electrical composite transmission device in the third embodiment. FIG. 3C shows the shape of the optical-electrical composite cable when passing through holes of 3 mm or less in diameter.

The optical-electrical composite cable of the third embodiment has a flexible board 31 as an electrical signal transmission member having an electric wiring section 34, and an optical fiber 32 as an optical signal transmission member. The flexible board 31 has a plurality of mounting sections 35 on a lateral side of the resin base section 31A at predetermined intervals. Each of the mounting sections 35 has one hole 35A, and the optical fiber 32 is inserted in the holes 35A. It is to be noted that each mounting section 35 may have two or more holes 35A corresponding to its size.

In the third embodiment, the mounting sections 35 are provided for mounting the optical fiber 32 onto the flexible board 31, so that the width of the electric wiring section 34 can be set to be close to the width of the flexible board 31. Therefore, the third embodiment is effective in the case where the width of the electric wiring section 34 needs to be close to the width of the flexible board 31 and in the case where the width of the flexible board 31 should be as narrow as possible.

Fourth Embodiment

Figure 4A:
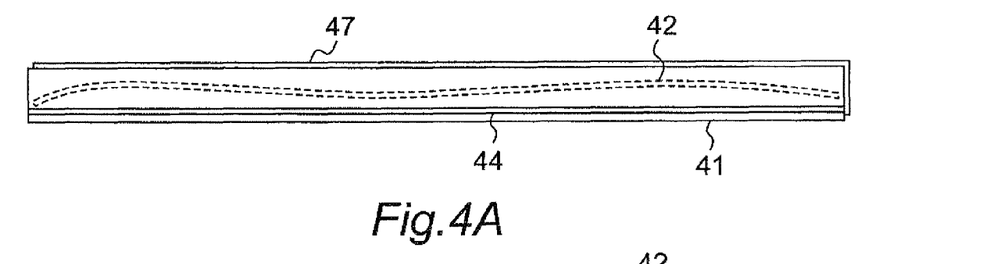
FIG. 4A is a plan view.
Figure 4B:
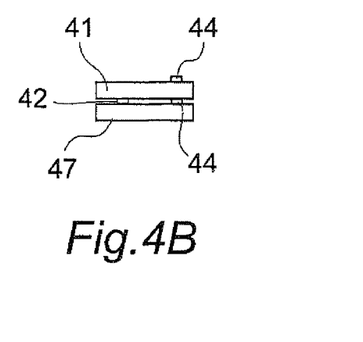
FIG. 4B is a cross sectional view taken along 4B-4B line of FIG. 4A.
Figure 4C:
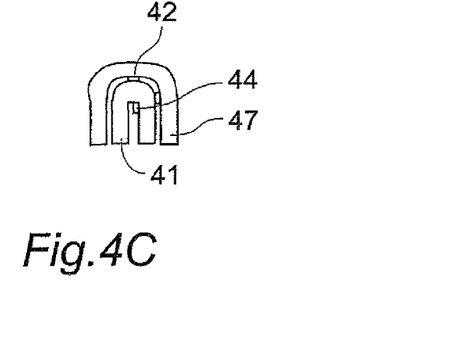
FIG. 4C is a view showing an end surface of the optical-electrical composite cable bent around the line parallel to the axial direction of the cable.

FIGS. 4A and 4B schematically show an optical-electrical composite cable as an optical-electrical composite transmission device in the fourth embodiment. FIG. 4C shows the shape of the optical-electrical composite cable when passing through holes of 3 mm or less in diameter.

In the fourth embodiment, an optical fiber 42 as an optical signal transmission member is interposed in between two flexible boards 41 and 47, and these two flexible boards 41, 47 are stuck together with adhesives. The flexible board 41 has an electric wiring section 44 and constitutes an electrical signal transmission member. Another flexible board 47 also has an electric wiring section 44 as with the flexible board 41, and this flexible board 47 can also function as an electrical signal transmission member where necessary.

Fifth Embodiment

Figure 5A:
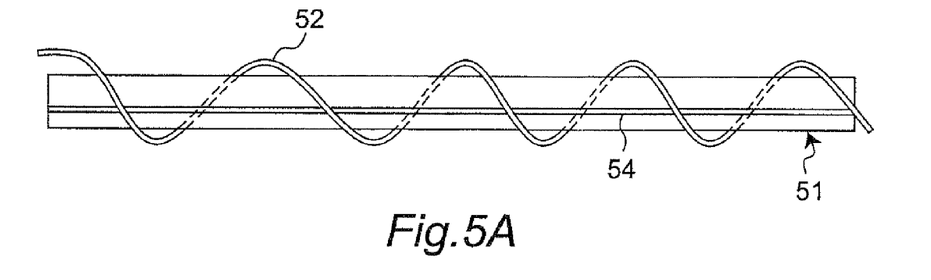
FIG. 5A is a plan view.
Figure 5B:
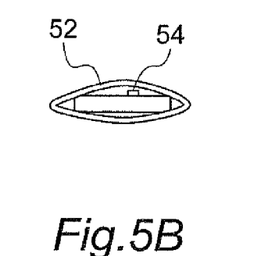
FIG. 5B is a cross sectional view taken along 5B-5B line of FIG. 5A.
Figure 5C:
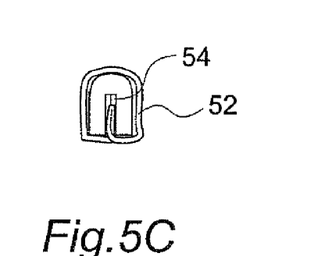
FIG. 5C is a view showing an end surface of the optical-electrical composite cable bent around the line parallel to the axial direction of the cable.

FIGS. 5A and 5B schematically show an optical-electrical composite cable as an optical-electrical composite transmission device in the fifth embodiment. FIG. 5C shows the shape of the optical-electrical composite cable when passing through holes of 3 mm or less in diameter.

The optical-electrical composite cable of the fifth embodiment has a flexible board 51 as an electrical signal transmission member having an electric wiring section 54, and an optical fiber 52 as an optical signal transmission member. The optical fiber 52 is spirally wound around the flexible board 51. Although the length of the optical fiber 52 needs to be made longer than the length of the flexible board 51 in the fifth embodiment, it becomes possible to preclude the necessity of securing the length precision of the optical fiber 52 by increasing and decreasing the winding number of the optical fiber 52 in accordance with the length of the optical fiber 52.

Sixth Embodiment

Figure 6A:
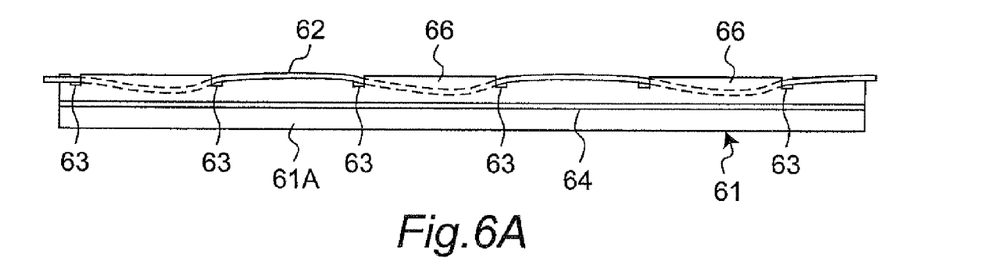
FIG. 6A is a plan view.
Figure 6B:
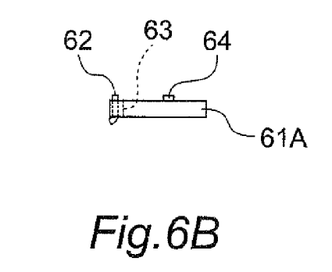
FIG. 6B is a cross sectional view taken along 6B-6B line of FIG. 6A.
Figure 6C:
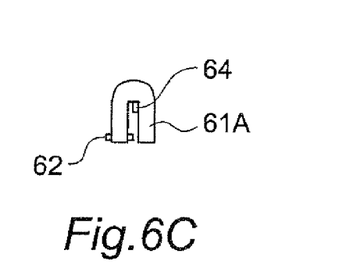
FIG. 6C is a view showing an end surface of the optical-electrical composite cable bent around the line parallel to the axial direction of the cable.

FIGS. 6A and 6B schematically show an optical-electrical composite cable as an optical-electrical composite transmission device in the sixth embodiment. FIG. 6C shows the shape of the optical-electrical composite cable when passing through holes of 3 mm or less in diameter.

The optical-electrical composite cable of the sixth embodiment has a flexible board 61 as an electrical signal transmission member having an electric wiring section 64, and an optical fiber 62 as an optical signal transmission member. The flexible board 61 has a plurality of notch sections 63 on one side of a resin base section 61A at predetermined intervals. The optical fiber 62 is fitted in the notch sections 63 so as to alternately cross one side (upper side) and the other side (lower side) of sections 66 between adjacent notch sections 63 and 63 of the base section 61A.

Although the notch sections 63 are formed only on one side of the resin base section 61A of the flexible board 61 in the present embodiment, the notch sections may be alternately formed on both sides of the resin base section 61A. In that case, the optical fiber 62 may be fitted in the notch sections on only one of the two sides. Moreover, the optical fiber 62 may also be fitted in the notch sections alternately on both sides by spirally winding the optical fiber 62 around the flexible board 61. Moreover, different optical fibers may be fitted in the notch sections on both sides, respectively.

Seventh Embodiment

Figure 7A:
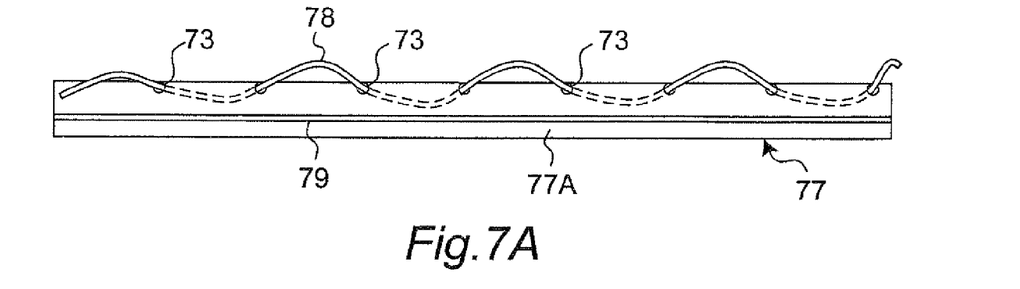
FIG. 7A is a plan view.
Figure 7B:
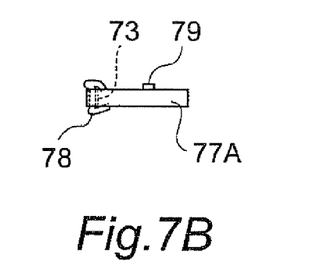
FIG. 7B is a cross sectional view taken along 7B-7B line of FIG. 7A.
Figure 7C:
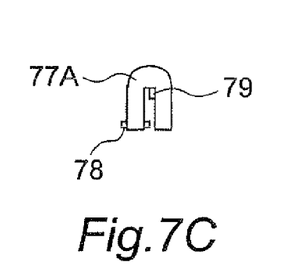
FIG. 7C is a view showing an end surface of the optical-electrical composite cable bent around the line parallel to the axial direction of the cable.

FIGS. 7A and 7B schematically show an optical-electrical composite cable as an optical-electrical composite transmission device in the seventh embodiment. FIG. 7C shows the shape of the optical-electrical composite cable when passing through holes of 3 mm or less in diameter.

The optical-electrical composite cable in the seventh embodiment has an optical waveguide board 77 as an optical signal transmission member having an optical waveguide 79 formed thereon and an electric cable 78 as an electrical signal transmission member. The optical waveguide board 77 has a plurality of holes 73 formed on one side of the optical waveguide 79 at predetermined intervals along the extending direction of the optical waveguide 79. The electric cable 78 is passed through a plurality of the holes 73 so as to thread through a base section 77A of the optical waveguide board 77. The optical waveguide board 77 and the electric cable 78 constitute a composite cable. The electric cable 78 constitutes, for example, an electrical signal line and a power source line. The optical waveguide board 77 is made of, for example, resin such as polyimide.

According to the optical-electrical composite cable in the seventh embodiment, the electric cable 78 which is an electrical signal transmission member and the optical waveguide board 77 which is an optical signal transmission member are integrated so as not to be separated. Consequently, even when the characteristics (tensile strength, thermal expansion coefficient) of the transmission lines respectively embodied by the electric cable 78 and the optical waveguide board 77 are different between them, an optical-electrical composite cable with stable flexibility as a whole can be implemented. As explained in the first embodiment, the substantial diameter of the optical-electrical composite cable can be made 3 mm or less by bending the optical-electrical composite cable into a shape shown in FIG. 7C, so that the optical-electrical composite cable can be fitted into holes with a diameter of 3 mm or less in small-size equipment. Therefore, it becomes possible to provide an optical-electrical composite transmission device suitable for, for example, foldable mobile phones having a hinged section.

Eighth Embodiment

Figure 8A:
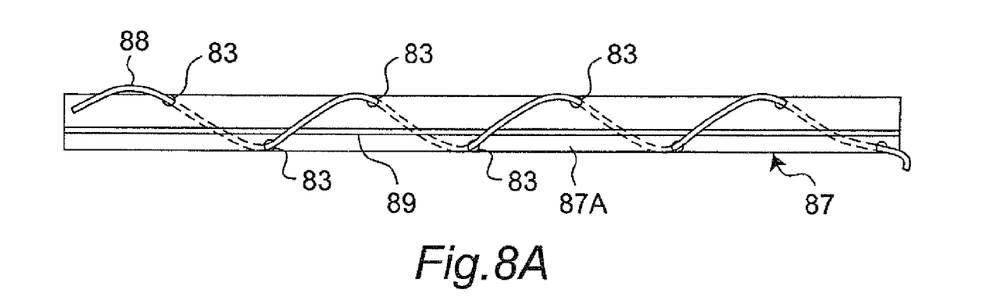
FIG. 8A is a plan view.
Figure 8B:
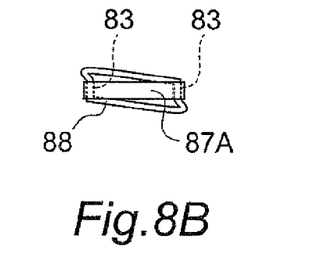
FIG. 8B is a cross sectional view taken along 8B-8B line of FIG. 8A.
Figure 8C:
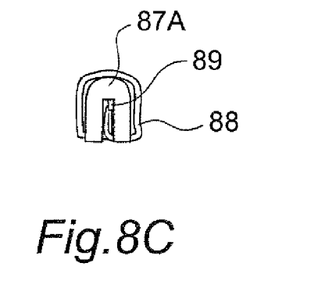
FIG. 8C is a view showing an end surface of the optical-electrical composite cable bent around the line parallel to the axial direction of the cable.

FIGS. 8A and 8B schematically show an optical-electrical composite cable as an optical-electrical composite transmission device in the eighth embodiment. FIG. 8C shows the shape of the optical-electrical composite cable when passing through holes of 3 mm or less in diameter.

The optical-electrical composite cable of the eighth embodiment is structured so that holes 83 for passing an electric cable 88 which is an electrical signal transmission member are formed in a zigzag pattern in a base section 87A of a waveguide board 87 which is an optical signal transmission member having an optical waveguide 89, and that the electric cable 88 is inserted in a plurality of the holes 83 placed in a zigzag pattern so as to thread through the base section 87A. The electric cable 88 constitutes, for example, an electrical signal line and a power source line. The optical waveguide board 87 is made of, for example, resin such as polyimide.

Although the length of the electric cable 88 in the composite cable of the eighth embodiment is longer than that in the above-mentioned seventh embodiment, the electric cable 88 is placed symmetrically with respect to the optical waveguide 89, so that the composite cable has flexibility superior to the seventh embodiment.

Although a plurality of the holes 83 formed in the base section 87A of the optical waveguide board 87 are alternately placed in a zigzag pattern on both sides of the optical waveguide 89 one hole at a time in the present embodiment, the holes 83 may alternately be placed on both sides of the optical waveguide 89 two or more holes at a time. Moreover, a plurality of the holes 83 do not necessarily have to be placed in a zigzag pattern, but may be formed in any part of the base section 87A as long as the optical waveguide 89 is not affected.

Ninth Embodiment

Figure 9A:
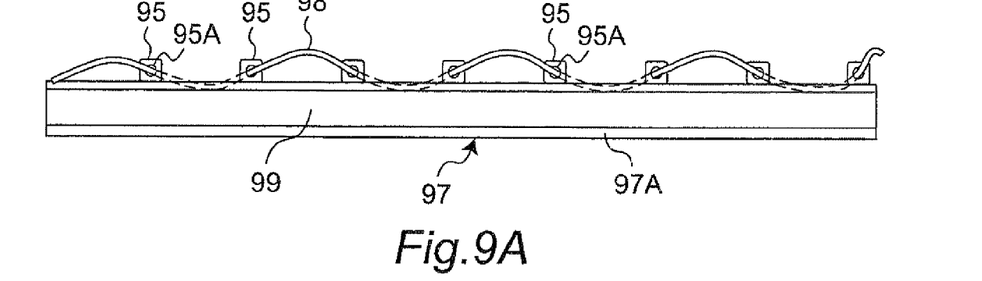
FIG. 9A is a plan view.
Figure 9B:
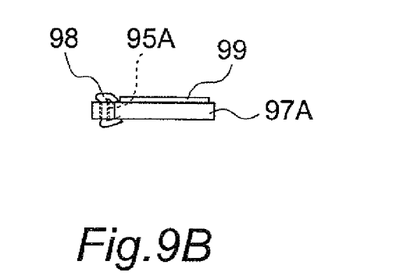
FIG. 9B is a cross sectional view taken along 9B-9B line of FIG. 9A.
Figure 9C:
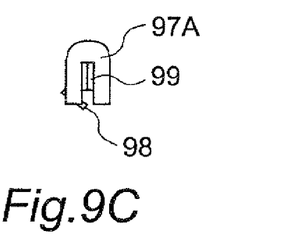
FIG. 9C is a view showing an end surface of the optical-electrical composite cable bent around the line parallel to the axial direction of the cable.

FIGS. 9A and 9B are a plan view and a cross sectional view for schematically showing an optical-electrical composite cable as an optical-electrical composite transmission device in the ninth embodiment. FIG. 9C shows the shape of the optical-electrical composite cable when passing through holes of 3 mm or less in diameter.

The optical-electrical composite cable in the ninth embodiment has a waveguide board 97 as an optical signal transmission member having an optical waveguide 99 and an electric cable 98 as an electrical signal transmission member. The waveguide board 97 has a plurality of mounting sections 95 on a lateral side of a base section 97A at predetermined intervals. Each of the mounting sections 95 has one hole 95A, and the electric cable 98 is inserted in the holes 95A. The optical waveguide board 97 is made of, for example, resin such as polyimide. It is to be noted that each mounting section 95 may have two or more holes 95A corresponding to its size as in the case of the third embodiment.

In the ninth embodiment, the mounting sections 95 are provided for mounting the electric cable 98 onto the waveguide board 97, so that the width of the optical waveguide 99 can be set to be close to the width of the waveguide board 97. Therefore, the ninth embodiment is effective in the case where the width of the optical waveguide 99 needs to be close to the width of the waveguide board 97 and in the case where the width of the waveguide board 97 should be as narrow as possible.

Tenth Embodiment

Figure 10A:
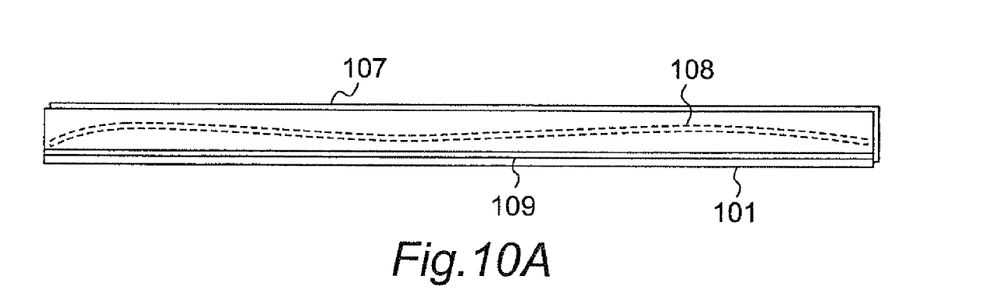
FIG. 10A is a plan view.
Figure 10B:
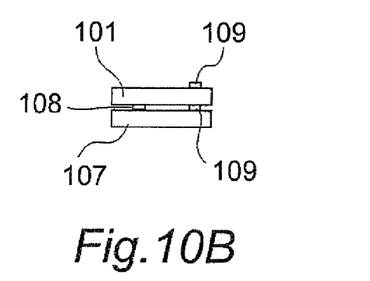
FIG. 10B is a cross sectional view taken along 10B-10B line of FIG. 10A.
Figure 10C:
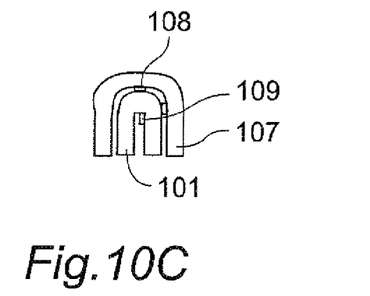
FIG. 10C is a view showing an end surface of the optical-electrical composite cable bent around the line parallel to the axial direction of the cable.

FIGS. 10A and 10B are a plan view and a cross sectional view for schematically showing an optical-electrical composite cable as an optical-electrical composite transmission device in the tenth embodiment. FIG. 10C shows the shape of the optical-electrical composite cable when passing through holes of 3 mm or less in diameter.

In the tenth embodiment, an electric cable 108 as an electrical signal transmission member is interposed in between two waveguide boards 101 and 107, and these two waveguide boards 101, 107 are stuck together with adhesives. The waveguide board 101 has an optical waveguide 109 and constitutes an optical signal transmission member. Another waveguide board 107 also has a waveguide 109 as with the waveguide board 101, and this waveguide board 107 can also function as an optical signal transmission member where necessary. The optical waveguide boards 101, 107 are made of, for example, resin such as polyimide.

Eleventh Embodiment

Figures 11A, 11B, 11C:
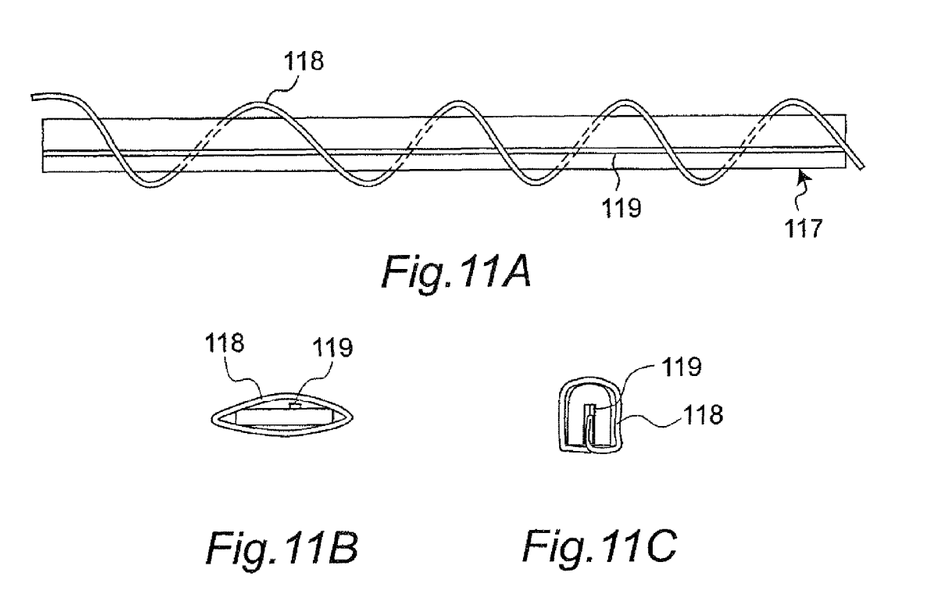
FIG. 11A is a plan view.
FIG. 11B is a cross sectional view taken along 11B-11B line of FIG. 11A.
FIG. 11C is a view showing an end surface of the optical-electrical composite cable bent around the line parallel to the axial direction of the cable.

FIGS. 11A and 11B are a plan view and a cross sectional view for schematically showing an optical-electrical composite cable as an optical-electrical composite transmission device in the eleventh embodiment. FIG. 11C shows the shape of the optical-electrical composite cable when passing through holes of 3 mm or less in diameter.

The optical-electrical composite cable in the eleventh embodiment has a waveguide board 117 as an optical signal transmission member having an optical waveguide 119 and an electric cable 118 as an electrical signal transmission member. The electric cable 118 is spirally wound around the waveguide board 117. Although the length of the electric cable 118 needs to be made longer than the length of the waveguide board 117 in the eleventh embodiment, it becomes possible to preclude the necessity of securing the length precision of the electric cable 118 by increasing and decreasing the winding number of the electric cable 118 in accordance with the length of the waveguide board 117. It is to be noted that the optical waveguide board 117 is made of, for example, resin such as polyimide.

Twelfth Embodiment

Figure 12A:
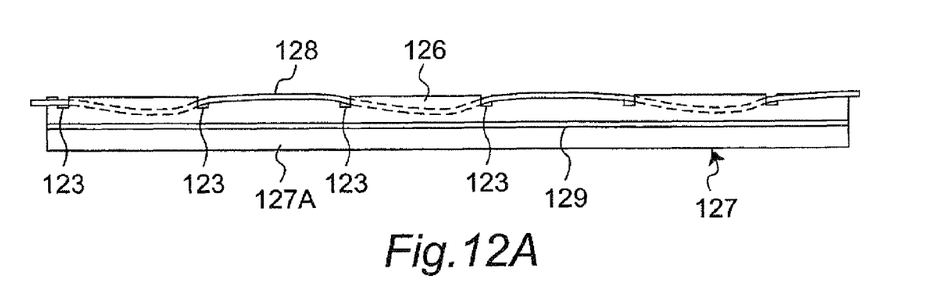
FIG. 12A is a plan view.
Figure 12B:
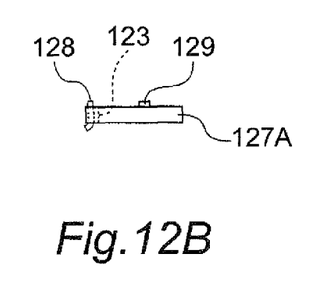
FIG. 12B is a cross sectional view taken along 12B-12B line of FIG. 12A.
Figure 12C:
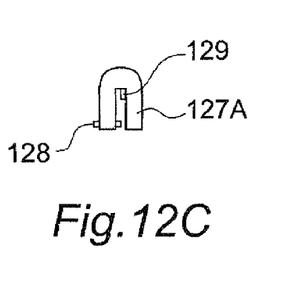
FIG. 12C is a view showing an end surface of the optical-electrical composite cable bent around the line parallel to the axial direction of the cable.

FIGS. 12A and 12B are a plan view and a cross sectional view for schematically showing an optical-electrical composite cable as an optical-electrical composite transmission device in twelfth embodiment. FIG. 12C shows the shape of the optical-electrical composite cable when passing through holes of 3 mm or less in diameter.

The optical-electrical composite cable in the twelfth embodiment has a waveguide board 127 as an optical signal transmission member having an optical waveguide 129 and an electric cable 128 as an electrical signal transmission member. The waveguide board 127 has a plurality of notch sections 123 on one side of a base section 127A at predetermined intervals. The electric cable 128 is fitted in the notch sections 123 so as to alternately cross one side (upper side) and the other side (lower side) of sections 126 between adjacent notch sections 123 and 123 of the base section 127A. The optical waveguide board 127 is made of, for example, resin such as polyimide.

Although the notch sections 127 are formed only on one side of the base section 127A of the waveguide board 127 in the present embodiment, the notch sections may be alternately formed on both sides of the base section 127A. In that case, the electric cable 128 may be fitted in the notch sections on only one of the two sides. Moreover, the electric cable 128 may also be fitted alternately in the notch sections on both sides by spirally winding the electric cable 128 around the waveguide board 127. Moreover, different electric cables may be fitted in the notch sections on both sides, respectively.

Examples of the optical fibers, which embody the optical signal transmission members in the first to sixth embodiments, may include POF (plastic fiber), PCS (plastic-clad silica fiber), glass fiber and multi-core fiber. The optical-electrical composite cables in the first to twelfth embodiments may be folded into two to have a diameter of substantially 3 mm or less as shown in the drawings such as FIG. 1C, so that the optical-electrical composite transmission devices suitable for, for example, foldable mobile phones having a hinged section can be implemented.

Embodiments being thus described, it will be obvious that the same may be varied in many ways. Such variations are not to be regarded as a departure from the spirit and scope of the embodiments, and all such modifications as would be obvious to one skilled in the art are intended to be included within the scope of the following claims.

What is claimed is:

1. An optical-electrical composite transmission device, comprising:

an optical signal transmission member; and an electrical signal transmission member, the optical signal transmission member and the electrical signal transmission member being integrated so as not to be separated from each other, wherein the optical signal transmission member is optical fiber, wherein the electrical signal transmission member is a flexible board having opposite longitudinal sides, and wherein the optical fiber is passed through a plurality of holes formed in the flexible board, wherein the plurality of the holes are placed on the opposite longitudinal sides of the flexible board in a zigzag pattern along a longitudinal direction of the flexible board, and wherein the optical fiber is inserted in the plurality of holes placed in the zigzag pattern in the flexible board alternately from one longitudinal side to the other in such a manner as to thread through the flexible board.

2. The optical-electrical composite transmission device according to claim 1, wherein the optical fiber is a plastic fiber.

3. The optical-electrical composite transmission device according to claim 1, wherein the optical fiber is a plastic-clad silica fiber.

4. The optical-electrical composite transmission device according to claim 1, wherein the optical fiber is a glass fiber.

5. The optical-electrical composite transmission device according to claim 1, wherein the optical fiber is a multi-core fiber.

6. The optical-electrical composite transmission device according to claim 1, wherein the optical-electrical composite transmission device is an optical-electrical composite cable which is able to pass through a hole of 3 mm or less in diameter.

7. Electronic equipment comprising the optical-electrical composite transmission device according to claim 1.

* * * * *